(12) United States Patent
Moon et al.

(10) Patent No.: US 10,353,055 B2
(45) Date of Patent: Jul. 16, 2019

(54) 3D LASER SCANNING APPARATUS AND 3D LASER SCANNING SYSTEM INCLUDING THE SAME

(71) Applicant: KOREA ELECTRONICS TECHNOLOGY INSTITUTE, Gyeonggi-do (KR)

(72) Inventors: Yeon Kug Moon, Gyeonggi-do (KR); Ho Young Park, Seoul (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 269 days.

(21) Appl. No.: 15/308,059

(22) PCT Filed: Sep. 26, 2016

(86) PCT No.: PCT/KR2016/010739
§ 371 (c)(1),
(2) Date: Oct. 31, 2016

(87) PCT Pub. No.: WO2017/065424
PCT Pub. Date: Apr. 20, 2017

(65) Prior Publication Data
US 2017/0184706 A1    Jun. 29, 2017

(30) Foreign Application Priority Data
Oct. 16, 2015 (KR) .................. 10-2015-0144838
Feb. 26, 2016 (KR) .................. 10-2016-0023595

(51) Int. Cl.
*G01S 7/48* (2006.01)
*G01S 7/481* (2006.01)
*G01S 17/08* (2006.01)
*G02B 3/00* (2006.01)
*G01S 17/42* (2006.01)

(52) U.S. Cl.
CPC .......... *G01S 7/4817* (2013.01); *G01S 7/4816* (2013.01); *G01S 17/08* (2013.01); *G01S 17/42* (2013.01); *G02B 3/0043* (2013.01)

(58) Field of Classification Search
None
See application file for complete search history.

(56) References Cited

U.S. PATENT DOCUMENTS 9,784,837 B1 * 10/2017 Olsson .................... G01S 17/66
2006/0065841 A1 * 3/2006 Hietanen ........... H01L 27/14661
250/370.09
2006/0097290 A1 * 5/2006 Hietanen ............... H01L 23/481
257/233

(Continued)

FOREIGN PATENT DOCUMENTS

KR          101417431         7/2014

*Primary Examiner* — Hovhannes Baghdasaryan
(74) *Attorney, Agent, or Firm* — Blueshift IP, LLC; Robert Plotkin (57) ABSTRACT

Provided is a 3-dimensional (3D) scanning technique using a laser. The technique includes a laser outputting device configured to emit omni-directionally a laser beam output from a laser beam source in 360 degrees and a laser receiving device formed above or below the laser outputting device and configured to receive a laser beam reflected by an object which is located on a propagation path of a laser beam output from the laser outputting device.

7 Claims, 7 Drawing Sheets

(56) References Cited

U.S. PATENT DOCUMENTS

| | | | |
|---|---|---|---|
| 2009/0073536 A1* | 3/2009 | Goetz | B82Y 20/00 |
| | | | 359/245 |
| 2010/0020306 A1* | 1/2010 | Hall | G01S 7/4813 |
| | | | 356/5.01 |
| 2014/0111812 A1* | 4/2014 | Baeg | G01B 11/25 |
| | | | 356/610 |
| 2015/0009485 A1* | 1/2015 | Mheen | G01S 17/87 |
| | | | 356/4.01 |
| 2015/0192677 A1* | 7/2015 | Yu | G01S 17/936 |
| | | | 356/5.01 |
| 2016/0329369 A1* | 11/2016 | Harmon | H01L 31/00 |
| 2018/0113210 A1* | 4/2018 | Izadian | G01S 13/90 |

\* cited by examiner

3D LASER SCANNING APPARATUS AND 3D LASER SCANNING SYSTEM INCLUDING THE SAME

TECHNICAL FIELD

The present invention relates to a 3-dimensional (3D) scanning technique using a laser, and more particularly, to a 3D laser scanning apparatus that may scan omni-directionally in 360 degrees using a laser beam source, and a 3D laser scanning system including the same.

BACKGROUND ART

Light detection and ranging (LIDAR) is one of remote detection apparatuses that can irradiate a target object with light (e.g., a laser beam), analyze light reflected by the corresponding object, and measure distance, direction, velocity, temperature, material distribution, concentration property, and the like of the corresponding object. The LIDAR may more precisely measure physical properties (temperature, material distribution, concentration property, etc.), distance, direction, and velocity of an object by utilizing an advantage of a laser that can generate a pulse signal having a high energy density and a short period.

The LIDAR is being used in various fields such as 3-dimensional (3D) image acquisition, meteorological observation, measurement of velocity or distance of an object, automatic driving, and the like by using a laser beam source having a specific wavelength or a laser beam source of which a wavelength is changeable as a light source. For example, the LIDAR is being used for precise analysis of atmospheric and global environmental observations by being mounted on aircraft, satellites, and the like, and is being used as a means for compensating for a camera function such as distance measurement to an object and the like by being mounted on spacecraft and exploration robots. In addition, on the ground, technologies for LIDAR sensors having a simple form for long-distance measurement, car speed enforcement, and the like are being commercialized. Recently, the LIDAR is being used for 3D reverse engineering, autonomous cars, and the like by being used as a laser scanner or a 3D video camera.

A 3D laser scanner type of LIDAR which is recently widely used includes a head including a plurality of laser outputting devices and a plurality of laser sensors, and mechanically rotates the head using a motor. However, since such a type of LIDAR uses the plurality of laser outputting devices and the plurality of laser sensors, it is expensive and has a limitation that a viewing update period depends on a rotational velocity of its head.

Korea Patent No. 10-1417431, which relates to a 3D spatial information generation system using a LIDAR sensor, provides a 3D spatial information generation system using a LIDAR sensor including a two-dimensional (2D) LIDAR sensor unit mounted on the center of the outside of a vehicle wheel and configured to rotate with the wheel, an angle sensor configured to measure the rotation angle of the vehicle wheel, and a processing unit configured to generate 3D spatial information by reflecting the rotation angle measured by the angle sensor on 2D information measured by the LIDAR sensor unit.

DISCLOSURE

Technical Problem

The present invention is directed to providing a 3-dimensional (3D) laser scanning apparatus that may scan omni-directionally in 360 degrees using a laser beam source, and a 3D laser scanning system including the same.

The present invention is directed to providing a 3D laser scanning apparatus that may scan omni-directionally in 360 degrees without mechanical rotation, and a 3D laser scanning system including the same.

The present invention is directed to providing a 3D laser scanning apparatus, in which manufacturing costs may be reduced without degrading performance, and a 3D laser scanning system including the same.

Technical Solution

One aspect of the present invention provides a 3-dimensional (3D) laser scanning apparatus. The apparatus includes a laser outputting device configured to emit omni-directionally a laser beam output from a laser beam source in 360 degrees and a laser receiving device formed above or below the laser outputting device and configured to receive a laser beam reflected by an object which is located on a propagation path of a laser beam output from the laser outputting device.

In one embodiment, the laser receiving device may include a light receiving lens configured to collect the laser beam reflected by the object, and a light receiving unit configured to receive the laser beam collected through the light receiving lens.

In another embodiment, the light receiving unit may include a light receiving element configured to convert the laser beam into an electrical signal, and a readout unit configured to read an electrical signal from the light receiving element and perform signal processing on the electrical signal.

In still another embodiment, the light receiving element may be provided in a plurality and the plurality of light receiving elements may be arranged in a focal plane array (FPA) form.

In yet another embodiment, the light receiving element may be formed to have a cylindrical shape and may have a 360-degree horizontal viewing angle.

In yet another embodiment, the light receiving lens may be provided in a plurality and the plurality of light receiving lenses having different sizes may be arranged to concentrate light on the light receiving unit.

In yet another embodiment, the 3D laser scanning apparatus may further include metal lines configured to connect the light receiving elements to the readout unit, and the light receiving elements may correspond one-to-one with the metal lines.

In yet another embodiment, the metal lines may include a first metal line connected to an active area of the light receiving element and the readout unit, and a second metal line formed on the active area of the light receiving element.

In yet another embodiment, the second line may be provided in a plurality and the plurality of second lines may be arranged to have gaps therebetween so that interference does not occur by incident light.

Another aspect of the present invention provides a 3D laser scanning system. The system includes a 3D laser scanning apparatus including a laser outputting device configured to emit omni-directionally a laser beam output from a laser beam source in 360 degrees and a laser receiving device formed above or below the laser outputting device and configured to receive a laser beam reflected by an object which is located on a propagation path of a laser beam output from the laser outputting device, and a computing apparatus configured to measure a distance between the 3D laser scanning apparatus and the object based on a received signal.

In one embodiment, the computing apparatus may measure the distance between the 3D laser scanning apparatus and the object based on time of flight (ToF) of the received laser beam.

Advantageous Effects

In a 3-dimensional (3D) laser scanning apparatus according to one embodiment of the present invention and a 3D laser scanning system including the same, it is possible to scan omni-directionally in 360 degrees using a laser beam source.

In the 3D laser scanning apparatus according to one embodiment of the present invention and the 3D laser scanning system including the same, it is possible to scan omni-directionally in 360 degrees without mechanical rotation and fundamentally address a problem of a viewing update period.

In the 3D laser scanning apparatus according to one embodiment of the present invention and the 3D laser scanning system including the same, it is possible to reduce manufacturing costs without degrading performance.

MODES OF THE INVENTION

Since embodiments of the present invention are only examples for structural and functional description, the scope of the present invention should not be interpreted as being limited to the embodiments described below. That is, while the embodiments can be modified in various ways and take on various alternative forms, the scope of the invention should be understood as including equivalents which can realize the technical spirit of the invention. In addition, since it does not mean that a specific embodiment should include all purposes and effects proposed in the present invention or only the effects, the scope of the present invention should not be understood as being limited to the specific embodiment.

Meanwhile, meanings of terms described in this specification should be understood as follows.

The terms "first," "second," etc. used herein are only used to distinguish one element from another, and the scope of the present invention should not be limited by these terms. For example, a first element could be termed a second element, and, similarly, a second element could be termed a first element.

It should be understood that, when an element is referred to as being "connected" or "coupled" to another element, it can be directly connected or coupled to the other element or intervening elements can be present. In contrast, it should be understood that, when an element is referred to as being "directly connected" or "directly coupled" to another element, there are no intervening elements. Meanwhile, other words used to describe relationships between elements should be interpreted in a like fashion (i.e., "between" versus "directly between," "adjacent" versus "directly adjacent," etc.).

Elements of the invention referred to in singular may number one or more, unless the context clearly indicates otherwise. It will be further understood that the terms "comprise," "comprising," "include," and/or "including," when used herein, specify the presence of stated features, numbers, steps, operations, elements, components, and/or groups thereof, but do not preclude the presence or addition of one or more other features, numbers, steps, operations, elements, components, and/or groups thereof.

Identification codes (e.g., a, b, c, etc.) in steps, which are used for convenience of explanation, are not used for describing an order of the steps, and the steps may be performed in the different order from a described order, unless the context clearly indicates a particular order. That is, steps may be performed in the same order as the described order, may be performed substantially simultaneously, or may be performed in reverse.

The present invention may be implemented as a computer-readable code in a computer-readable recording medium. The computer-readable recording medium includes any type of recording devices in which data that can be read by a computer system is stored. Examples of the computer-readable recording medium include a read only memory (ROM), a random access memory (RAM), a compact disc read only memory (CD-ROM), a magnetic tape, a floppy disk, and an optical data storage device, and also include implementation in the form of a carrier wave (for example, transmission via the Internet). In addition, the computer-readable recording medium may be distributed to a computer system connected via a network and a code that can be read by a computer may be stored and executed in a distributed manner.

Unless otherwise defined, all terms used herein have the same meaning as commonly understood by those skilled in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
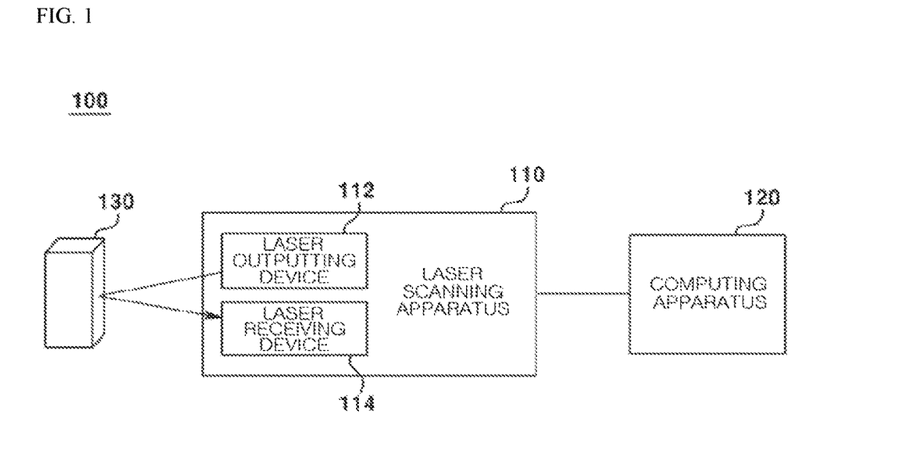
FIG. 1 is a diagram for describing a 3-dimensional (3D) laser scanning system according to one embodiment of the present invention.

Referring to FIG. 1, a 3-dimensional (3D) laser scanning system 100 includes a 3D laser scanning apparatus 110 and a computing apparatus 120.

The 3D laser scanning apparatus 110 includes an outputting device 112 and a light receiving device 114. The 3D laser scanning apparatus 110 outputs laser beams omni-directionally in 360 degrees around the 3D laser scanning apparatus 110 and receives a laser beam reflected by a subject 130 which is positioned in the vicinity thereof. In one embodiment, the 3D laser scanning apparatus 110 may correspond to light detection and ranging (LIDAR). The 3D laser scanning apparatus 110 generates an electrical signal corresponding to the received laser beam to transmit the electrical signal to the computing apparatus 120.

The outputting device 112 emits light emitted from a light source in various directions. The outputting device 112 omni-directionally emits the light emitted from the light source in 360 degrees. The outputting device 112 diffuses laser beams output from the light source, and outputs a plurality of laser beams which are uniformly distributed in all directions of a side surface of a cylindrical (hollow) diffraction grating by passing the diffused laser beams from the inside of the cylindrical diffraction grating in an outward direction of the side surface. In this case, the diffraction grating may be arranged in a circumferential direction, and the light source may be positioned inside the diffraction grating. The outputting device 112 outputs a plurality of uniformly diffused laser beams omni-directionally in 360 degrees around the 3D laser scanning apparatus 110.

The light receiving device 114 is positioned at a predetermined position and receives a laser beam of the plurality of laser beams output from the outputting device 112, which is reflected by the subject 130 positioned on a propagation path. That is, light, which is emitted from the outputting device 112 and then reflected by the subject 130, is emitted to the light receiving device 114. The light receiving device 114 generates an electrical signal corresponding to the received laser beam to transmit the electrical signal to the computing apparatus 120.

The computing apparatus 120 measures a distance between the 3D laser scanning apparatus 110 and the subject 130 based on the signal received from the 3D laser scanning apparatus 110. In one embodiment, the computing apparatus 120 may measure the distance between the 3D laser scanning apparatus 110 and the subject based on time of flight (ToF) of the received laser beam. In one embodiment, the computing apparatus 120 may measure a direction of the subject 130 based on the signal received from the 3D laser scanning apparatus 110.

Figure 2:
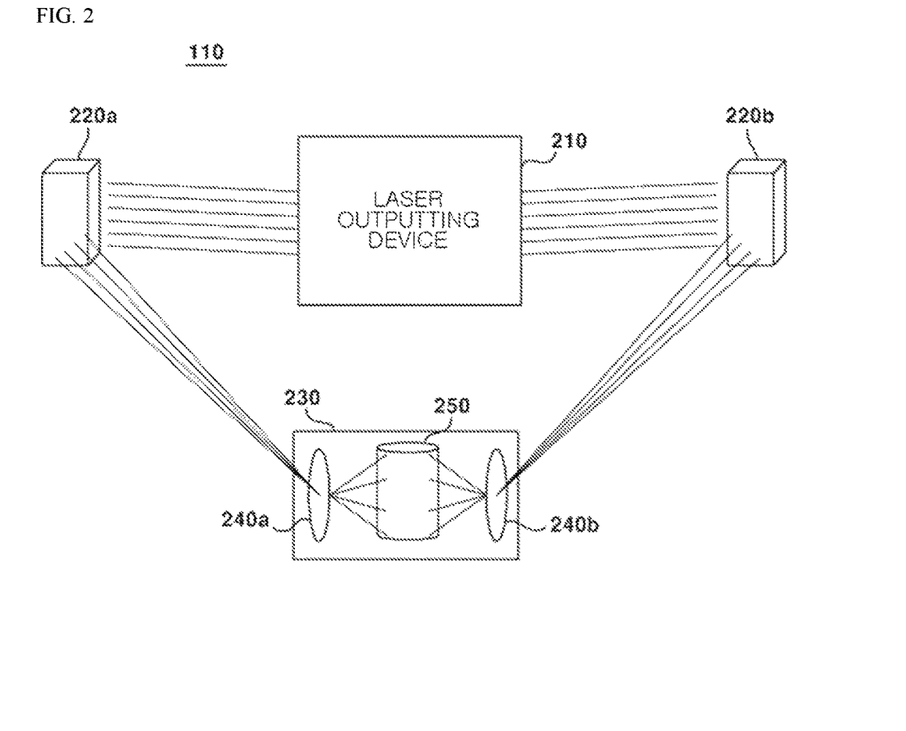
FIG. 2 is a block diagram illustrating a configuration of a 3D laser scanning apparatus illustrated in FIG. 1.

FIG. 2 is a block diagram illustrating a configuration of the 3D laser scanning apparatus illustrated in FIG. 1.

Referring to FIG. 2, the 3D laser scanning apparatus 110 includes the outputting device 210 and the light receiving device 230.

The outputting device 310 may include a light source which outputs a laser beam, a refractive lens, and a conical mirror. Light output from the light source is uniformly diffused through the refractive lens to be incident on the mirror. The light incident on the conical mirror is emitted omni-directionally in 360 degrees. In the present embodiment, the refractive lens and the conical mirror are used as optical apparatuses which emit light output from a light source in 360 degrees, but the present invention is not limited thereto.

The laser beams output from the outputting device 210 are reflected by subjects 220a and 220b, and the light receiving device 230 receives laser beams reflected by the subjects 220a and 220b.

The light receiving device 230 includes light receiving lenses 240a and 240b and a light receiving unit 250. The light receiving unit 250 includes a light receiving element and a readout unit. The light receiving element may be a light sensor. The light receiving element may be a photo-diode (PD). Light transmitted through the light receiving lenses 240 may be emitted to the light receiving unit 250.

The light receiving lenses collect (concentrate) the laser beams reflected by the subjects 220a and 220b, and the light receiving unit 250 receives the laser beams collected through the light receiving lenses 240a and 240b. That is, light transmitted through the light receiving lenses 240a and 240b may be emitted to the light receiving unit 250.

In one embodiment, the light receiving lenses 240a and 240b may be positioned on the periphery of the light receiving unit 250 to receive laser beams from any direction of 360 degrees around the light receiving device 230. In some embodiments, a plurality of light receiving lenses may be positioned on the periphery of the light receiving unit 250. Furthermore, the plurality of light receiving lenses 240 may be arranged along a side surface of a cylinder or a taper. In this case, the plurality of light receiving lenses 240 may be arranged in a circumferential direction. Alternatively, the plurality of light receiving lenses 240 may be arranged in an axial direction. Further, the plurality of light receiving lenses 240 may be aligned with each other in a circumferential direction and an axial direction. The plurality of light receiving lenses 240 may have different sizes, and may be divided into two or more groups according to their sizes. In this case, sizes of the light receiving lenses included in the same group are the same.

FIGS. 4 to 7 are views illustrating various embodiments of a laser receiving device.

The light receiving device may include a plurality of light receiving lenses 240 and a light receiving unit 250, and may be embodied in various shapes as will be described below. The light receiving device may be preferably installed above or below an outputting device in a vertical form.

Figure 3:
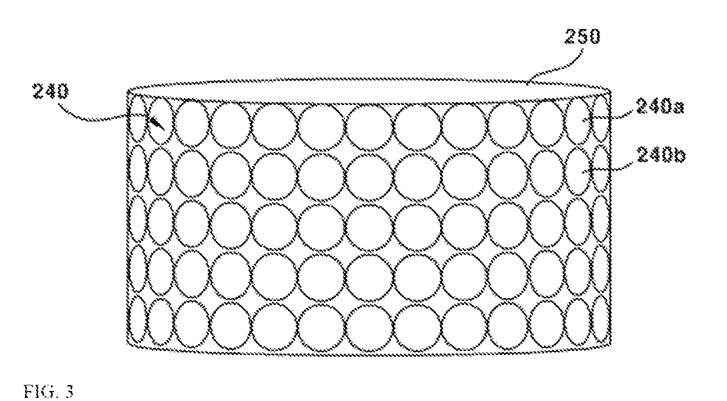
FIG. 3 is a view illustrating an example of a light receiving unit and a plurality of light receiving lenses.

FIG. 3 is a view illustrating an example of a plurality of light receiving lenses 240 and a cylindrical light receiving unit 250.

Referring to FIG. 3, the plurality of light receiving lenses 240 are arranged on the periphery of the light receiving unit 250. The light receiving lenses 240 may collect laser beams received at a corresponding position to concentrate the laser beams on a sensor of the light receiving unit 250 corresponding to the corresponding position. Lens properties (a refraction angle, a focal distance, etc.) of the light receiving lens 240 may be designed so that laser beams are concentrated on a sensor of the light receiving unit 250 corresponding to the corresponding position.

A size of the light receiving lens 240 may vary according to embodiments. In one embodiment, the light receiving lens may have a size corresponding to a plurality of light receiving elements. For example, when a single light receiving lens has a size which covers an area of a plurality of sensors, the corresponding light receiving lens may concentrate laser beams on the plurality of light receiving elements.

In another embodiment, the light receiving lens may have a size corresponding to a single light receiving element. For example, when the single light receiving lens has a size which covers an area of a single light receiving element, the corresponding light receiving lens may concentrate laser beams on the corresponding light receiving element.

Figure 4:
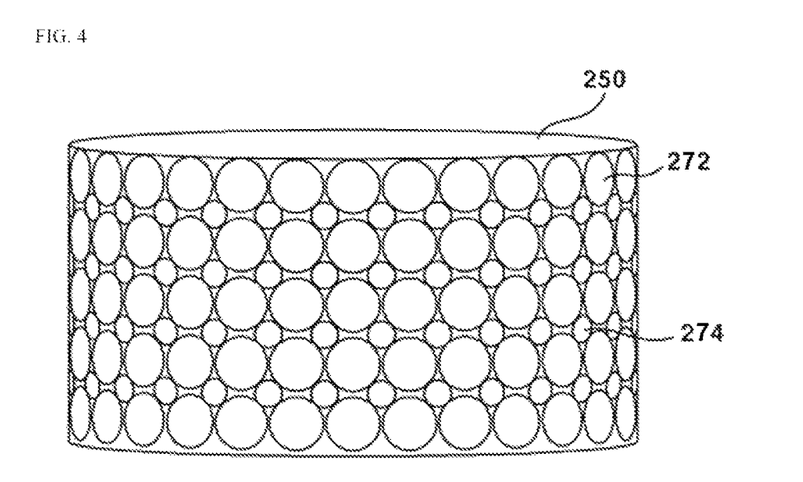
FIG. 4 is a view illustrating another example of the light receiving unit and the plurality of light receiving lenses.

FIG. 4 is a view illustrating another example of the light receiving unit and the plurality of light receiving lenses.

Referring to FIG. 4, a plurality of light receiving lenses 240 having different sizes may be arranged on the periphery of the light receiving unit 250. For example, first light receiving lenses 272 having a first size may be arranged, and second light receiving lenses 274 having a second size may be arranged between the first light receiving lenses 272. The second light receiving lens 274 may correspond to a light receiving element positioned between the first light receiving lenses 272.

In one embodiment, the first light receiving lens 272 may correspond to a plurality of light receiving elements to concentrate laser beams on the plurality of corresponding light receiving elements. The second light receiving lens 274 may correspond to a single light receiving element to concentrate laser beams on the corresponding light receiving element. Lens properties (a refraction angle, a focal distance, etc.) of each of the first light receiving lenses 272 and the second light receiving lenses 274 may be designed so that laser beams are concentrated on the light receiving element of the light receiving unit 250 corresponding to the corresponding position.

In FIGS. 3 and 4, the cylindrical light receiving units are described, but the shape of the light receiving unit may vary according to the embodiments.

Figure 5:
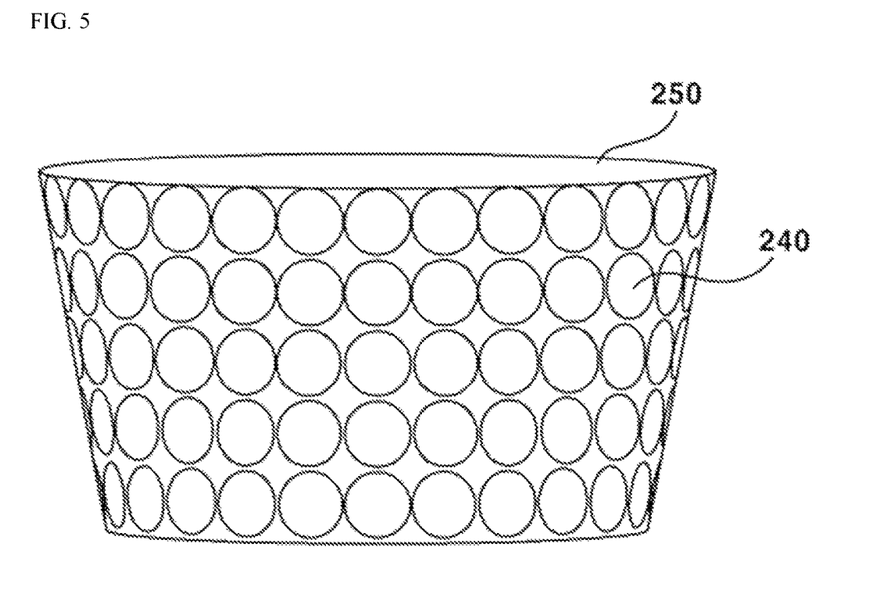
FIG. 5 is a view illustrating one embodiment of the light receiving unit.
Figure 6:
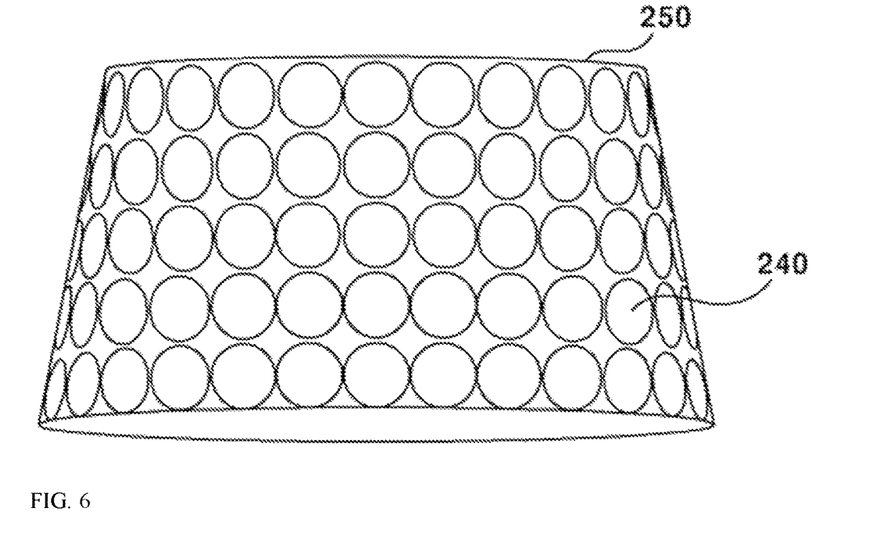
FIG. 6 is a view illustrating another embodiment of the light receiving unit.

FIGS. 5 and 6 are views illustrating examples in which a diameter of an upper surface of a light receiving unit 250 is different from a diameter of a lower surface thereof.

FIG. 5 is a view illustrating a case in which the diameter of the upper surface of the light receiving unit 250 is greater than the diameter of the lower surface thereof.

A light receiving device may be positioned at a position at which a laser beam reflected by an object may be easily received, and the light receiving unit may have a shape in which the laser beam may be easily received.

For example, when the light receiving device is positioned above an outputting device, the light receiving unit 250 may have a trapezoidal cylindrical shape of which a diameter of an upper portion is greater than a diameter of a lower portion as illustrated in FIG. 4. Light receiving lenses 240 may be positioned at a side surface of the cylinder, and a side surface of the light receiving unit 250 may be tilted downward to easily receive a laser beam received from a direction of a lower side surface.

FIG. 6 is a view illustrating a case in which the diameter of the lower surface of the light receiving unit 250 is greater than the diameter of the upper surface thereof.

Figure 11:
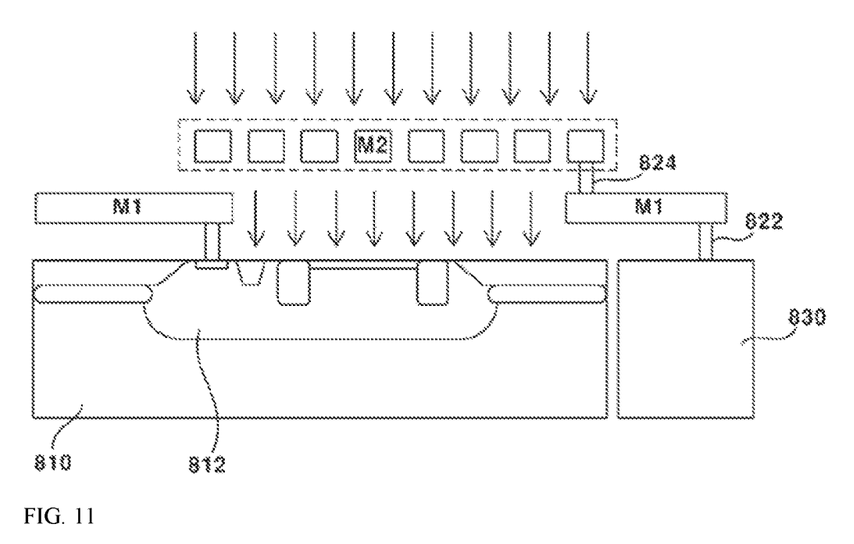

When the light receiving device is positioned below the outputting device, the light receiving unit 250 may have a trapezoidal cylindrical shape of which a diameter of a lower portion is greater than a diameter of an upper portion as illustrated in FIG. 11. Light receiving lenses 240 may be positioned at a side surface of the cylinder, and a side surface of the light receiving unit 250 may be tilted upward to easily receive a laser beam received from a direction of an upper side surface.

In another embodiment, the light receiving unit 250 may have a cylindrical shape of which the diameter of the lower portion is the same as the diameter of the upper portion, and directions of the light receiving lenses 240 may be adjusted by control. For example, when the light receiving device is positioned above the outputting device, the light receiving lenses 240 may be adjusted to face the direction of the lower side surface, and when the light receiving device is positioned below the outputting device, the light receiving lenses 240 may be adjusted to face the direction of the upper side surface.

Figure 7:
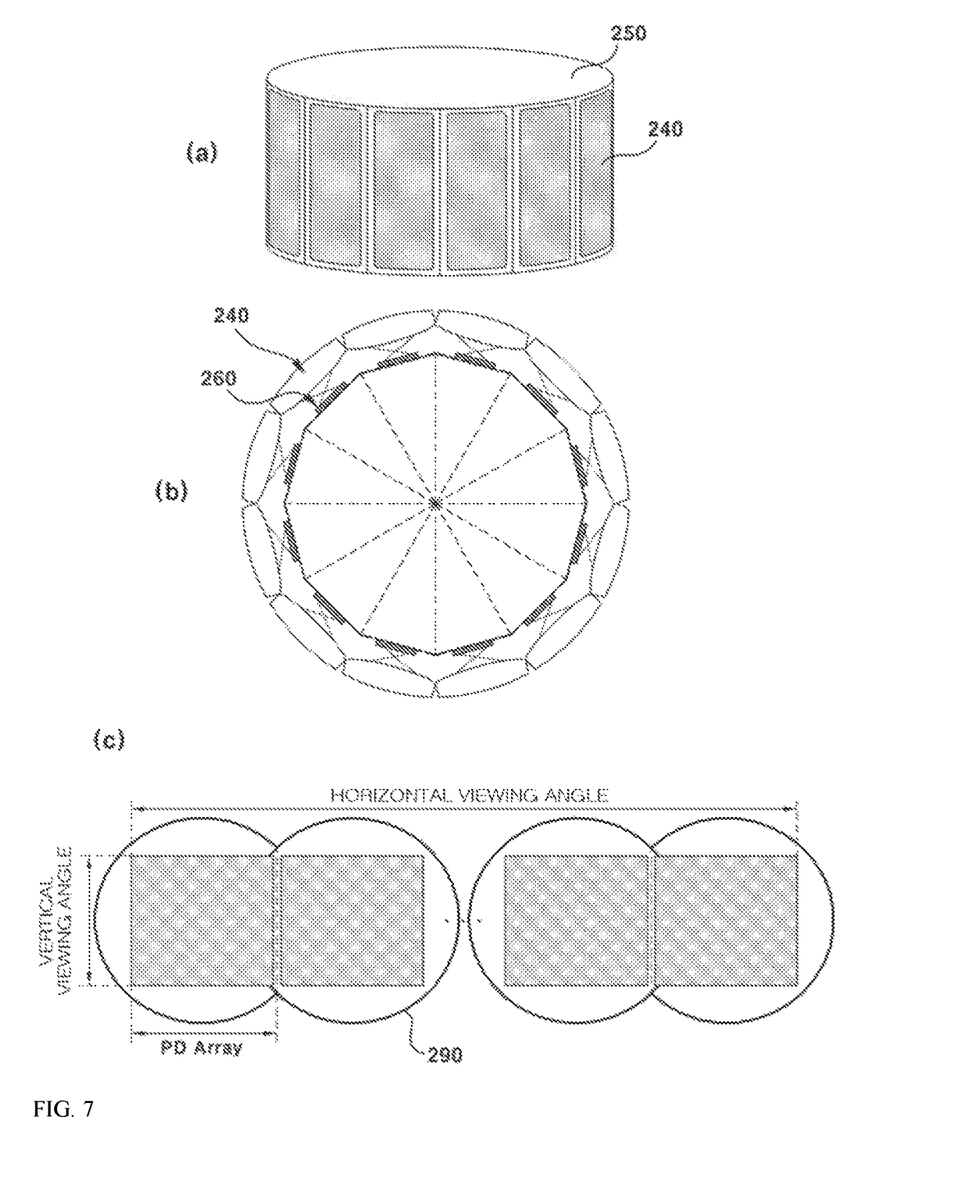
FIG. 7 is a view illustrating still another embodiment of the light receiving unit.

FIG. 7 illustrates views of a case in which a light receiving unit 250 has a polygonal shape, where FIG. 7A is a perspective view of the light receiving unit, FIG. 7B is a plan view of the light receiving unit, and FIG. 7C is a development view of the light receiving unit.

As illustrated in FIG. 7, the light receiving unit 250 may be formed to have a polygonal shape, and in the present embodiment, a case in which the light receiving unit 250 has a dodecagonal shape is illustrated. With such a polygonal structure, a ToF light receiving element array having a horizontal viewing angle of 360 degrees may be embodied. Meanwhile, a plurality of light receiving elements may be arranged in a circumferential direction to have a viewing angle of 360 degrees. It should be noted that only one embodiment of a light receiving element array is illustrated in FIG. 7.

Referring to FIG. 7C, light receiving elements (PDs) are disposed as if they are attached to each other in series without gaps. A single light receiving element has a circular viewing angle 290, and the horizontal viewing angle may cover all directions of 360 degrees when the light receiving elements are attached to each other in series without gaps. The PD is an element, which detects a laser beam and converts the laser beam into an electrical signal.

Light receiving lenses 240 may be formed on an upper portion of each surface of the light receiving unit 250 in order to secure horizontal/vertical viewing angles of a ToF sensor, and light receiving elements 260 which receive and detect laser beams concentrated by the light receiving lenses 240 are formed on the light receiving unit 250. PDs may be used as the light receiving elements 260, and may be arranged in a focal plane array (FPA) form.

Figure 8:
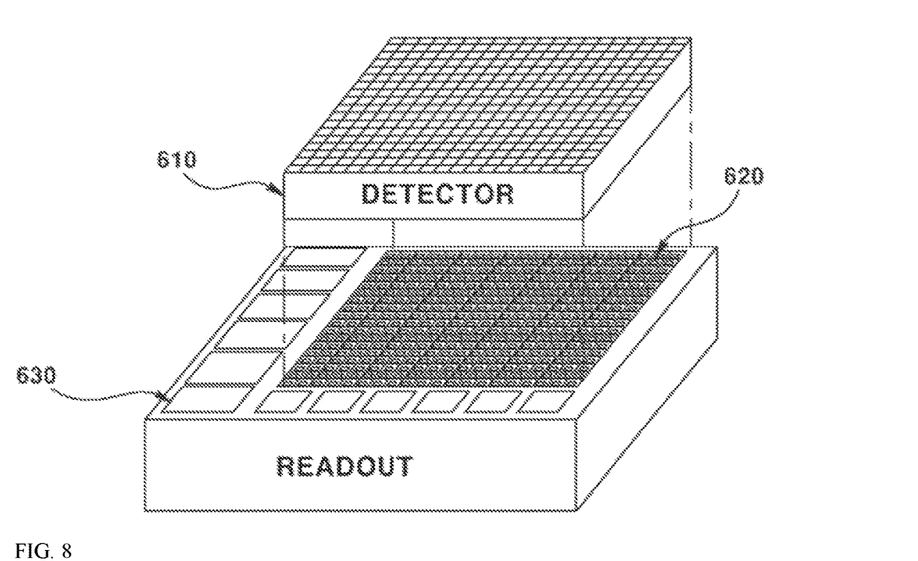
FIG. 8 is a view for describing a focal plane array (FPA) sensor of the light receiving unit.

FIG. 8 is a view illustrating an example in which light receiving elements 260 are arranged in an FPA form. Hereinafter, for convenience of explanation, description will be made assuming a case in which the light receiving unit 250 has a cylindrical shape of which a diameter of a lower portion is the same as a diameter of an upper portion.

Referring to FIG. 8, the light receiving unit 250 includes a light receiving element array 610 arranged in an FPA form and a readout unit 630.

The light receiving element array 610 includes light receiving elements which convert received light into an electrical signal, and m×n light receiving elements arranged in a matrix form constitute the light receiving element array 610. The light receiving element array 610 is electrically connected to the readout unit 630 through an interconnect bump 620. A sensor or a PD may be used as the light receiving element.

The readout unit 630 reads an electrical signal from each of the light receiving elements of the light receiving element array 610, and outputs the electrical signal by performing signal processing. The readout unit 630 may read the electrical signal from each sensor in an event-driven manner. A signal output from the readout unit 630 may be transmitted to the computing apparatus 120.

Figure 9:
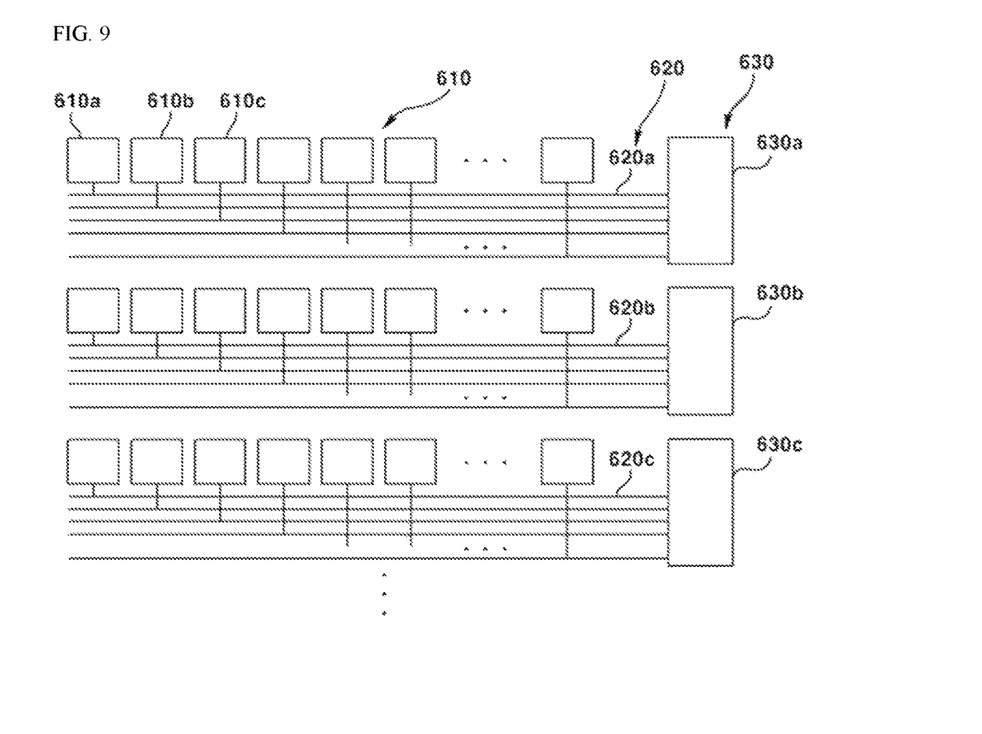
FIG. 9 is a view for describing a readout circuit of the FPA sensor.

FIG. 9 is a view for describing a detailed circuit configuration of the light receiving unit.

A light receiving element array includes a plurality of light receiving elements 610 which are arranged in a matrix form, and each of the light receiving elements 610 is electrically connected to a readout unit 630 through a readout line 620. That is, a plurality of readout lines 620 may correspond one-to-one with the plurality of light receiving elements 610. The readout line may be referred to as a "metal line."

The readout unit 630 reads an electrical signal from each of the light receiving elements in an event-driven manner.

A single readout line 620 may be connected to a single light receiving element 610, and when an event occurs (e.g., when the corresponding sensor receives a laser beam), the readout line 620 transmits an electrical signal which is generated in the corresponding sensor to the readout unit 630.

When the plurality of light receiving elements 610 are connected to a single readout line 620, since the readout line 620 cannot read simultaneously electrical signals from the plurality of light receiving elements 610, an FPA sensor may not recognize a plurality of simultaneously received laser beams. Therefore, a readout circuit is configured such that a single readout line 620 is connected to a single light receiving element 610, and thus an FPA sensor may recognize a plurality of simultaneously received laser beams. That is, the light receiving elements (sensors) correspond one-to-one with the readout lines.

The readout unit 630 controls electrical signals to be read from the plurality of light receiving elements 610. When the readout unit 630 receives an electrical signal, the readout unit 630 identifies a sensor which receives the corresponding electrical signal, and transmits the corresponding electrical signal to a next signal processing apparatus (e.g., an amplifier, an analog-to-digital (AD) converter, etc.). A signal which is processed by the signal processing apparatus (e.g., an amplifier, an AD converter, etc.) may be transmitted to the computing apparatus 120.

However, when a layout of the readout lines is formed with this manner, there is a problem in that a volume of a chip is increased. Since the readout lines 620 have to be arranged so that the number of the readout lines 620 is the same as the number of the light receiving elements 610, there is a problem in that the number of the metal lines is increased and as a result, the volume thereof is increased.

A method of stacking metal lines (readout lines) in multiple layers may be considered to address these problems. However, when the metal lines are stacked in multiple layers, since the metal lines are disposed on PDs, there is a problem in that the PDs (light receiving elements) may not properly receive light.

Figure 10:
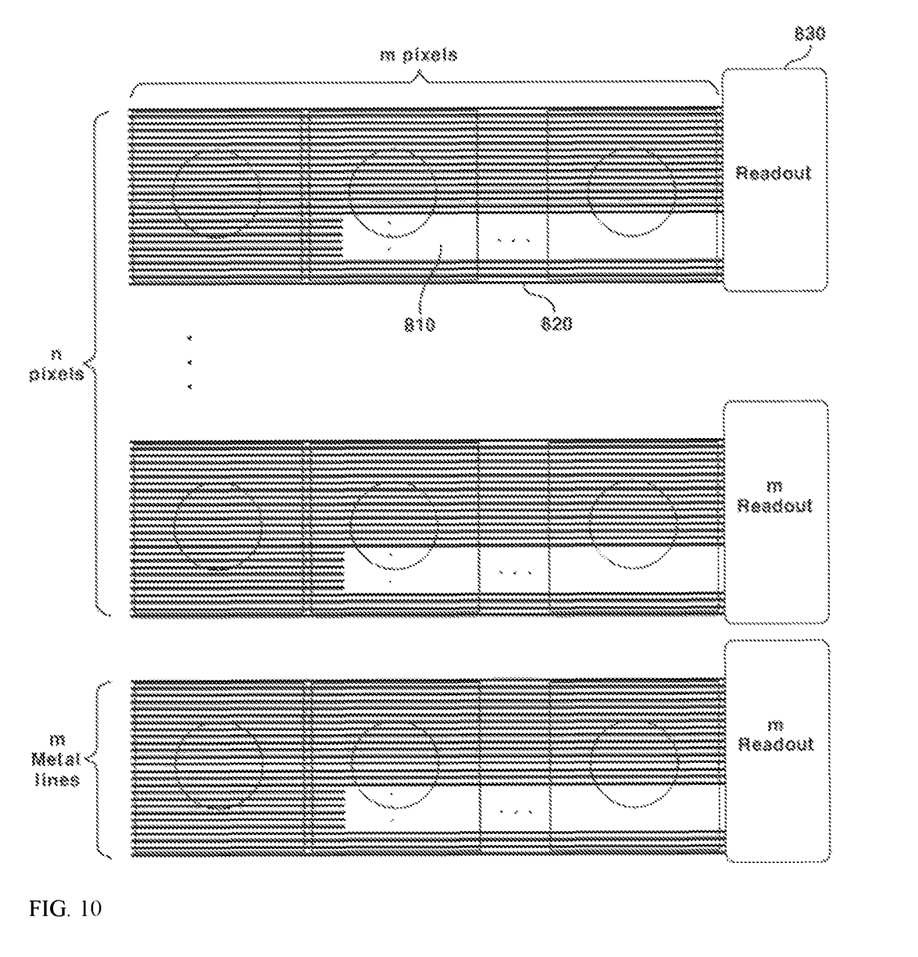
FIGS. 10 and 11 are views illustrating an arrangement method of readout lines according to one embodiment of the present invention.

FIGS. 10 and 11 are views illustrating an arrangement method of readout lines (metal lines) to address these problems, where FIG. 10 is a plan view of the readout lines and FIG. 11 is a cross-sectional view thereof.

As illustrated in FIGS. 10 and 11, since metal lines 820 are formed on PDs 810, a space in which the metal lines 820 are arranged may be reduced. To this end, each of the metal lines 820 includes a first line M1 and a second line M2.

Ends of the first line M1 are arranged to be electrically connected to an active area 812 of the PD 810 and a readout circuit 830, and the second line M2 are arranged on the PD 810. The first line M1 is electrically connected to the readout circuit 830 through a first contact 822, and the second line M2 is electrically connected to the first line M1 through a second contact 824.

In this case, the second lines M2 are arranged at predetermined intervals, and the interval varies according to a wavelength of a laser beam. Since a laser beam has a unique wavelength, interference may be prevented from occurring by appropriately adjusting the interval of the second metal lines. That is, the plurality of the second lines M2 may be arranged to have gaps therebetween so that interference does not occur by light emitted to the PD 810. When interference does not occur, a laser beam may be transmitted through the gaps between the metal lines even when the second metal lines are formed on the active area of the PD.

While the example embodiments of the present invention and their advantages have been described above in detail, it should be understood that various changes, substitutions, and alterations may be made herein by those skilled in the art without departing from the scope of the invention as defined by the following claims.

[Industrial Applicability]

The invention claimed is:

1. A 3-dimensional (3D) laser scanning apparatus comprising:
an outputting device configured to emit omni-directionally light emitted from a light source in 360 degrees; and
a light receiving device to which light emitted from the outputting device and then reflected by a subject is emitted,
wherein the light receiving device includes: a light receiving lens configured to concentrate light reflected by the subject; and a light receiving unit to which light transmitted through the light receiving device is emitted,
wherein the light receiving unit includes: a light receiving element configured to convert emitted light into an electrical signal; and a readout unit electrically connected to the light receiving element and configured to perform signal processing on an electrical signal which is generated in the light receiving element,
wherein the light receiving elements and the readout unit are electrically connected through a plurality of metal lines; and the plurality of metal lines correspond one-to-one with the plurality of light receiving elements,
wherein each of the metal lines includes: first lines electrically connected to an active area of the light receiving element and the readout unit through a first contact; and second lines arranged on the active area of the light receiving element and electrically connected to the first line through a second contact, and
wherein the second lines are arranged at predetermined intervals according to a wavelength of a laser beam to be received so that the received laser beam is incident on the active area of the light receiving element without interfering with the second lines.

2. The apparatus of claim 1, wherein:
the light receiving lens is provided in a plurality; and
the plurality of light receiving lenses are arranged along a side surface of a cylinder or taper.

3. The apparatus of claim 2, wherein the plurality of light receiving lenses have different sizes, and are divided into two or more groups according to their sizes.

4. The apparatus of claim 1, wherein:
the light receiving element is provided in a plurality; and
the plurality of light receiving elements are arranged in a focal plane array (FPA) form.

5. The apparatus of claim 4, wherein the plurality of light receiving elements are arranged in a circumferential direction to have a viewing angle of 360 degrees.

6. A 3D laser scanning system comprising:
a 3D laser scanning apparatus; and
a computing apparatus electrically connected to the 3D laser scanning apparatus and configured to measure a distance between the 3D laser scanning apparatus and a subject based on received light,
wherein the 3D laser scanning apparatus includes:
an outputting device configured to emit omni-directionally light emitted from a light source in 360 degrees; and
a light receiving device to which light emitted from the outputting device and then reflected by a subject is emitted,
wherein the light receiving device includes: a light receiving lens configured to concentrate light reflected by the subject; and a light receiving unit to which light transmitted through the light receiving device is emitted, wherein the light receiving unit includes: a light receiving element configured to convert emitted light into an electrical signal; and a readout unit electrically connected to the light receiving element and configured to perform signal processing on an electrical signal which is generated in the light receiving element, wherein the light receiving elements and the readout unit are electrically connected through a plurality of metal lines; and the plurality of metal lines correspond one-to-one with the plurality of light receiving elements, wherein each of the metal lines includes: first lines electrically connected to an active area of the light receiving element and the readout unit through a first contact; and second lines arranged on the active area of the light receiving element and electrically connected to the first line through a second contact, and wherein the second lines are arranged at predetermined intervals according to a wavelength of a laser beam to be received so that the received laser beam is incident on the active area of the light receiving element without interfering with the second lines.

7. The system of claim 6, wherein the computing apparatus measures the distance between the 3D laser scanning apparatus and the subject based on time of flight (ToF).

\* \* \* \* \*